Sept. 25, 1951 V. SCHWARZKOPF 2,569,261
DRIP SAVER STRUCTURE
Filed Oct. 22, 1948 2 Sheets-Sheet 1
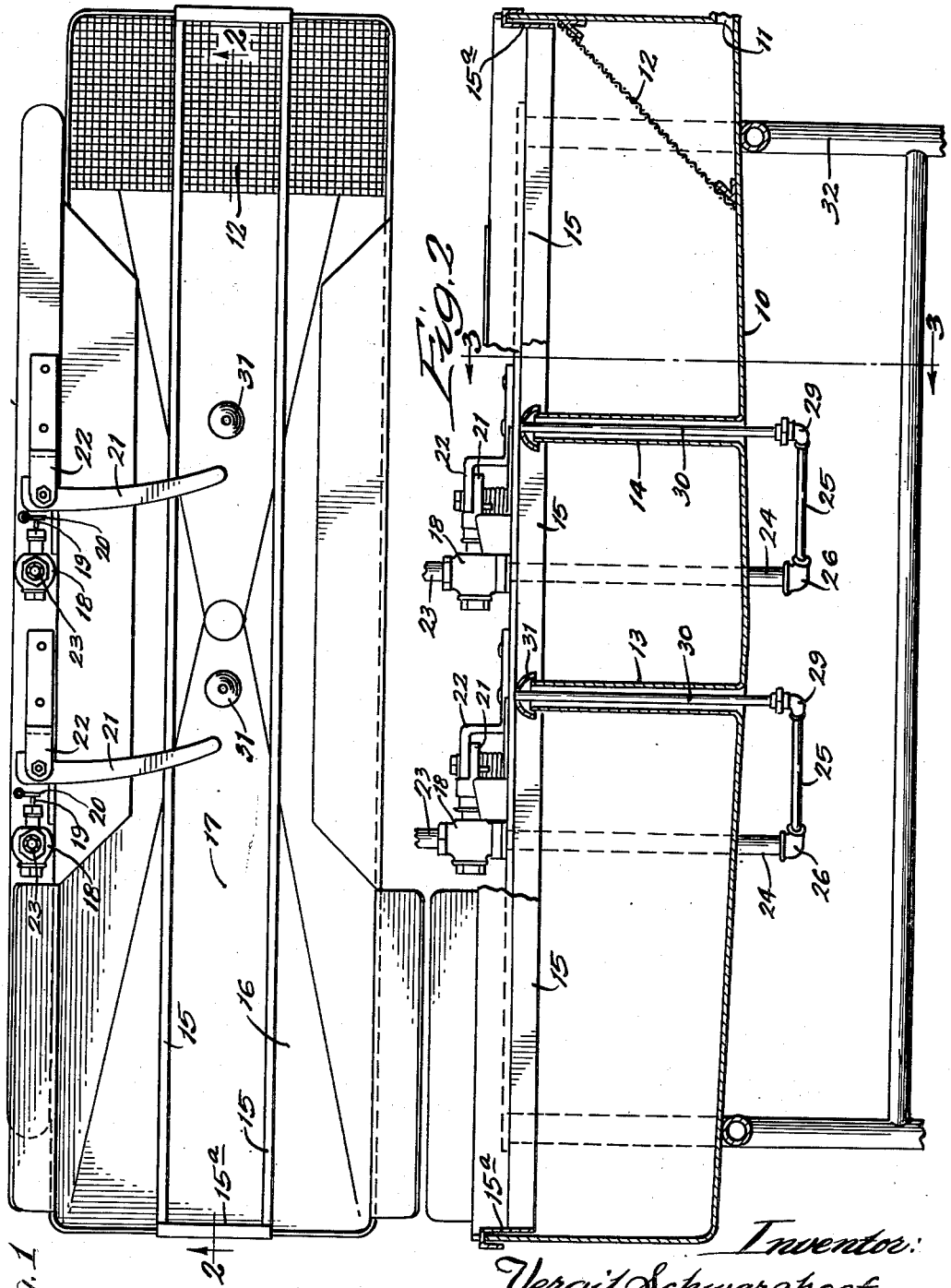
Inventor:
Vergil Schwarzkopf,
By Dawson, Ooms, Birth and Spangenberg,
Attorneys.

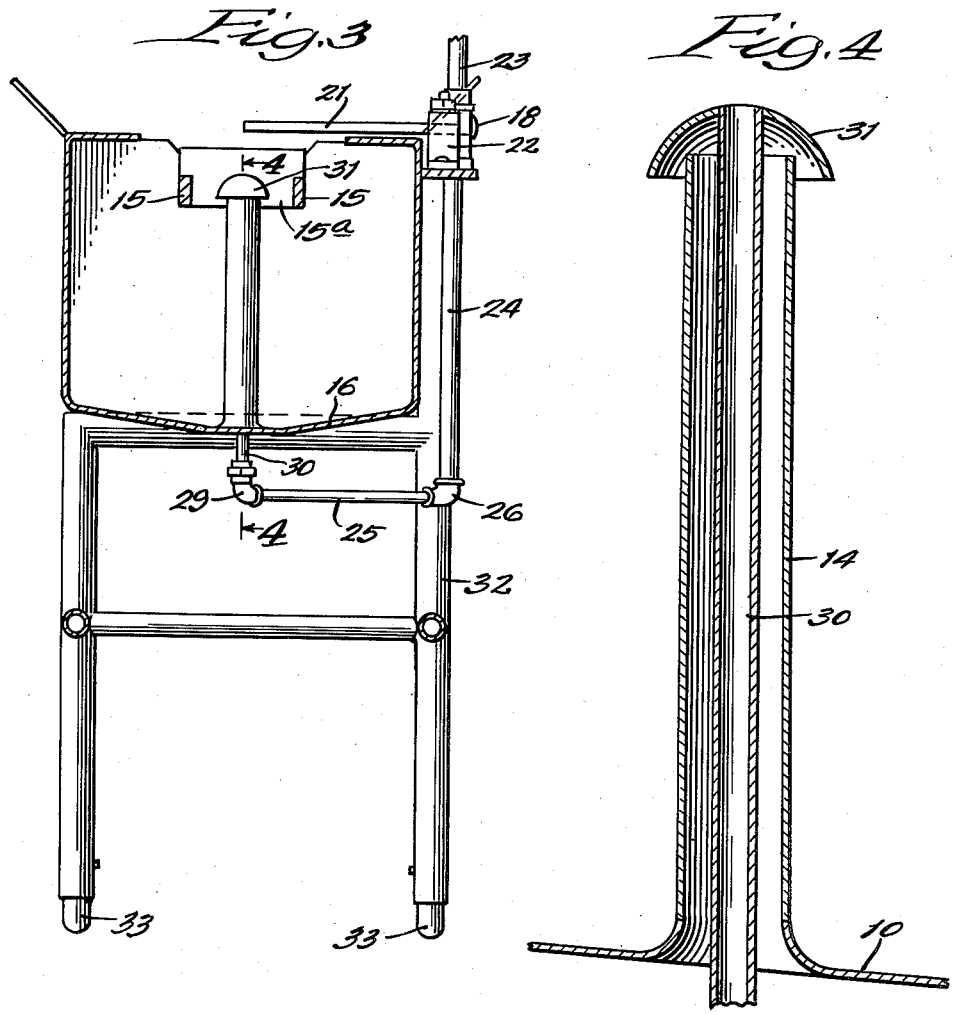

Patented Sept. 25, 1951

2,569,261

UNITED STATES PATENT OFFICE 2,569,261

DRIP SAVER STRUCTURE

Vergil Schwarzkopf, La Grange, Ill., assignor to The Lathrop-Paulson Company, Chicago, Ill., a corporation of Illinois Application October 22, 1948, Serial No. 56,006

6 Claims. (Cl. 34—69)

This invention relates to a drip saver structure and is particularly useful in the recovery of cream from milk cans which are being cleaned and sterilized.

Under present practice it is customary to invert the cream can and to pass it over a frame supporting a steam pipe, the end of the steam pipe being turned up so as to discharge steam into the interior of the can. Usually a valve handle is provided for the operation of a valve in the steam line and the handle is engaged by the can when the can reaches the desired position over the steam nozzle or steam pipe outlet, thus automatically bringing about the discharge of steam into the can. The difficulty encountered has been that cream falls onto the steam pipe, becomes discolored due to the high heat and then shows up in the butter later produced from the cream as brown specks. This burnt cream or brown specks showing up in the butter is not only objectionable from the consumer standpoint but also to the Food and Drug Department which requires that butter be free from sediment. The main problem here sought to be solved is the removal and recovery of the cream while avoiding such discoloration.

An object of the present invention is to provide apparatus for the recovery of cream from cream cans while at the same time preventing the burning of any portion of the cream falling from the can. Another object is to provide a drip saver device in which the cans operate levers for controlling the discharge of steam or hot fluid when the cans reach their desired positions while also providing means for protecting the cream against the steam or hot fluid pipe. A still further object is to provide effective apparatus for recovering cream from cream cans and the like while preventing the burning of the cream and while also providing a steam pipe supporting structure permitting the ready removal of the steam pipe from the cream tank. Other specific objects and advantages will appear as the specification proceeds.

The invention is illustrated, in a single embodiment, by the accompanying drawing, in which—

Figure 1 is a top plan view of apparatus embodying my invention; Fig. 2, a longitudinal sectional view, the section being taken as indicated at line 2—2 of Fig. 1; Fig. 3, a vertical sectional view, the section being taken as indicated at line 3—3 of Fig. 2; and Fig. 4, an enlarged detail sectional view, the section being taken as indicated at line 4 of Fig. 3.

In the illustration given 10 designates a tank adapted to receive the cream, steam condensate etc. and it may be of any suitable construction. I prefer to provide a stainless steel tank and one end of the tank is provided with an outlet 11 leading to any suitable point for the recovery of the cream. A strainer or screen 12 may be provided at one end of the tank and over the outlet 11.

In the specific illustration given, the tank 10 is provided with a pair of upwardly extending tubes 13 and 14 in spaced relation. Each tube is preferably formed of stainless steel, nickel, or the like, and the tube merges with the bottom wall of the tank as indicated in Fig. 2.

The tank is provided at its top with a pair of spaced track members 15 and 16, as shown best in Fig. 1, and are spaced apart to provide a drain space 17 therebetween. The can tracks or guides 15 and 16 are preferably equipped at their ends with suspension hooks 15a, as shown best in Fig. 2, and which permits the can tracks to be readily removed for cleaning. Thus, when the can is inverted and passed along the track members 15, cream is permitted to drip through the space 17 and into tank 10 below.

The drip saver is equipped with the usual steam pipe valve fitting 18 having a plunger 19 for actuating the valve and a pivoted member 20, as shown best in Fig. 1. A valve operating lever 21 is pivotally supported upon the bracket 22 and extends outwardly across the guide member 15 for engagement with the can. The valve operating lever 21 controls the flow of steam from the incoming steam line 23 to the steam pipe 24 which extends below the bottom of the tank 10. A connector pipe 25 extends between a fitting 26 with which the lower end of pipe 24 is equipped with a fitting 29 to which a steam pipe 30 is releasably connected. The steam pipe is connected by a standard coupling and is readily removable. It is preferably formed of stainless steel or nickel and is equipped at its top with a stainless steel hood or umbrella 31.

If desired, the tank 10 may be provided with a single tube 13 and steam pipe 30 and with a single valve lever 21 for controlling the flow of steam through the pipe 24. However, I prefer to provide two of such levers and other pipes in order that a greater number of cans can be expeditiously handled. The second tube 14 is the same as tube 13 and the steam pipe structures associated therewith are also the same.

The tank 10 may be supported upon any frame structure desired. In the illustration given, the tank is supported upon a metal frame 32 illustrated more clearly in Figs. 2 and 3.

Operation

In the operation of the structure, the inverted or up-ended cream can or the like is placed upon the track members 15 and 16 so that the cream dripping from the can flows into tank 10 or is directed by the guides 15 and 16 into this space. As the first can strikes the lever 21, the valve in fitting 18 is opened and steam is discharged upwardly through the pipe 30 into the interior of the can. Cream and condensate flow downwardly into the tank 10. A second can may then be pressed forwardly against the first can so that the first can will strike the second valve lever 21 and open the valve in the second line 24. Meanwhile, the second can is over the first steam pipe 30 and its interior is subjected to steam therefrom.

Steam and condensate collecting in tank 10 may be drawn off through outlet 11 to any desired point for the recovery of the cream.

While the invention has been described as particularly useful in the collecting of cream from cream cans it will be understood that the apparatus is useful also for the treating of milk cans and other cans containing food liquids.

The tubes 13 and 14 within the apparatus are effective in maintaining an insulating air space about each of the steam pipes 30 so that the steam pipes do not come in contact with the liquid. Further, the cap or hood 31 at the upper end of the steam pipe protects the space within the tubes 13 and 14 against the condensate and cream dripping from the cans. The release of the steam from the upper end of the steam pipe and the contact of the thin walls of the hoods 13 with condensate and cream maintain the hood or cap relatively cool so that no burning of the cream occurs thereon. At the same time, the cream within the can 10 is protected against burning by the air spaces between the pipe 30 and the tube walls 14.

The steam pipes 30 are connected with standard couplings and can be readily disconnected for cleaning.

The can tracks 15 and 16 which are equipped at their ends with suspension hooks 15a for supporting them upon the side walls of the tank 10, can be readily lifted off for separate cleaning. I prefer to form these tracks of stainless steel or equivalent material.

In order to provide the desired inclination for the tank, I prefer to equip the frame 32 with individually adjustable screw legs 33 having rounded lower edges. Such adjustable members are well known and need not be described in detail.

While in the foregoing specification, I have set out a specific structure in considerable detail for the purpose of illustrating one embodiment of the invention, such details of structure may be varied widely by those skilled in the art without departing from the spirit of my invention.

I claim:

1. In apparatus for recovering cream from cream cans and the like in which a tank is equipped with spaced guides for receiving up-ended cream cans and in which a valve-actuating arm is provided for controlling the flow of washing fluid, a tube extending through said tank and having its lower portion sealed to the bottom wall of the tank, a fluid tube communicating with said valve and extending through said tube in spaced relation thereto, and a hood fixed to the top end of said pipe above said tube and having downwardly and laterally-extending walls providing a shield over the upper open end of said tube.

2. In can-treating apparatus, a tank open at its top, spaced track members equipped at their ends with hooks suspending said track members from the end walls of said tank, said tracks being adapted to support cans in up-ended position over said tank, said tank having at least one opening in its bottom, a tube sealed to the bottom wall of said tank and having an opening lower end communicating with the exterior of said tank bottom and having also an open upper end extending upwardly into said tank, and a hot-fluid pipe spaced within said tube and adapted to discharge fluid between said suspended track members.

3. In cream-can treating apparatus, a frame, an elongated tank supported in said frame and having an outlet opening at one end, spaced guide members equipped with hooks at their ends for releasably supporting the same upon the walls of said tank, said track members being adapted to support cream cans in up-ended position thereon, said tank having a plurality of openings in its bottom in longitudinal alignment, tubes extending through said openings and sealed to the bottom wall of said tank, steam pipes extending through said tubes in spaced relation to the side walls thereof, caps carried by the ends of said pipes and shielding the upper ends of said tubes, steam conduits equipped with couplings releasably connected to said pipes, valve means controlling the flow of fluid through said conduits, and valve-actuating arms for controlling said valve means and extending across said tank for engagement with cans.

4. In apparatus for treating cream cans and the like in which a tank is equipped with spaced guides for receiving up-ended cream cans, a tube extending through said tank and having its lower portion sealed to the bottom wall of the tank, a fluid tube extending through said first-mentioned tube in spaced relation thereto and having an open end extending above said first-mentioned tube, and a hood apertured to receive the top end of said fluid tube and having downwardly-inclined walls extending over said first-mentioned tube.

5. In apparatus for treating cream cans and the like in which a tank is equipped with spaced guides for receiving up-ended cream cans, a tube extending through said tank and having its lower portion sealed to the bottom wall of the tank, a fluid tube extending through said first-mentioned tube in spaced relation thereto and having an open end extending above said first-mentioned tube, and a hood apertured to receive the top end of said fluid tube and having downwardly-inclined walls extending over said first-mentioned tube, said hood having its downwardly-inclined walls extending below the top of said first-mentioned tube and spaced outwardly therefrom.

6. In apparatus for recovering cream from cream cans and the like in which a tank is equipped with spaced guides for receiving up-ended cream cans, a tube extending through said tank and having its lower portion sealed to the bottom wall of the tank, a fluid tube leading from a source of fluid and extending through said first-mentioned tube in spaced relation thereto and terminating in an open end spaced above the top of said first-mentioned tube, and a hood about the upper portion of said fluid tube and having inclined sides extending over the top of said first-mentioned tube.

VERGIL SCHWARZKOPF.

REFERENCES CITED

The following references are of record in the file of this patent:

UNITED STATES PATENTS

| Number | Name | Date |
|---|---|---|
| 1,146,845 | Burham | July 20, 1915 |
| 1,583,069 | Nobis | May 4, 1926 |
| 1,626,452 | Cook | Apr. 26, 1927 |
| 1,632,588 | Braun | June 14, 1927 |
| 1,717,182 | Brauer et al. | June 11, 1929 |
| 1,904,743 | Malsbary | Apr. 18, 1933 |
| 2,198,898 | Winters, Jr. | Apr. 30, 1940 |